(12) United States Patent
Belinky

(10) Patent No.: US 6,241,271 B1
(45) Date of Patent: Jun. 5, 2001

(54) REMOVABLE TRAILER HITCH BALL

(75) Inventor: Jacob S. Belinky, Carleton, MI (US)

(73) Assignee: Draw-Tite, Inc., Canton, MI (US)

( * ) Notice: Subject to any disclaimer, the term of this patent is extended or adjusted under 35 U.S.C. 154(b) by 0 days.

(21) Appl. No.: 09/099,610

(22) Filed: Jun. 18, 1998

Related U.S. Application Data

(60) Provisional application No. 60/050,041, filed on Jun. 18, 1997.

(51) Int. Cl.$^7$ ....................................................... B60D 1/06
(52) U.S. Cl. ........................ 280/511; 280/415.1; 280/506
(58) Field of Search .................................... 280/511, 506, 280/415.1, 504, 515; 403/131, 378, 379

(56) References Cited

U.S. PATENT DOCUMENTS

| | | |
|---|---|---|
| 2,625,736 | 1/1953 | Klages . |
| 2,639,160 | 5/1953 | Studebaker et al. . |
| 2,768,848 * | 10/1956 | Mitchell et al. ..................... 280/511 |
| 3,587,154 | 6/1971 | Potter . |
| 3,736,635 | 6/1973 | Romer et al. . |
| 3,831,244 | 8/1974 | Amos . |
| 3,831,245 | 8/1974 | Amos . |
| 3,952,390 | 4/1976 | Amos . |
| 3,965,554 | 6/1976 | Amos . |
| 4,388,012 | 6/1983 | Erickson . |
| 4,433,854 | 2/1984 | Smith . |
| 4,522,421 * | 6/1985 | Vance ................................... 280/511 |
| 4,596,406 | 6/1986 | Van Vleet, aet al. . |
| 4,678,199 | 7/1987 | Dickmann . |
| 4,863,185 | 9/1989 | Coppe . |
| 4,889,356 * | 12/1989 | Morris ................................... 280/511 |
| 4,923,205 | 5/1990 | Durm . |
| 4,938,496 | 7/1990 | Thomas et al. . |
| 5,000,474 | 3/1991 | Kristensen . |
| 5,016,898 | 5/1991 | Works et al. . |
| 5,116,072 | 5/1992 | Swenson . |
| 5,143,393 | 9/1992 | Meyer . |
| 5,203,194 | 4/1993 | Marquardt . |
| 5,242,186 | 9/1993 | Pettersson . |
| 5,290,057 | 3/1994 | Pellerito . |
| 5,419,576 | 5/1995 | Van Vleet . |
| 5,472,222 | 12/1995 | Marcy . |
| 5,476,279 | 12/1995 | Klemetsen . |
| 5,577,751 | 11/1996 | Matthews . |
| 5,908,201 * | 6/1999 | Van Vleet ............................. 280/511 |

FOREIGN PATENT DOCUMENTS

| | | | |
|---|---|---|---|
| 1255509 * | 11/1967 | (DE) ..................................... 280/511 |
| 2922716 * | 12/1980 | (DE) ..................................... 280/511 |

OTHER PUBLICATIONS

Putnam Hitch Products—2 pages (Admitted Prior Art), Undated.
Convert–A–Ball—2 pages (Admitted Prior Art), Undated.

* cited by examiner

Primary Examiner—Daniel G. DePumpo
(74) Attorney, Agent, or Firm—Leon E. Redman; Lloyd D. Doigan

(57) ABSTRACT

A removable trailer hitch ball in which a generally spherical configuration hollow ball with opposed upper and lower vertically aligned bore holes for removable attachment to a stud with a cross bore aligned with transversely aligned holes on opposite sides of the hollow ball. A removable lock pin with a spring loaded detent ball is inserted through the transversely aligned holes of the hollow ball and stud. The spring loaded detent ball is protruded into a cavity between the side of the stud and the inner wall of the hollow ball to detachably secure the hollow ball onto the stud which may be integrally formed at the end of a drawbar for detachable connection to a receiver of a trailer hitch. Different size balls may be detachably secured to a given stud. In one embodiment the stud is formed in a shank integrally at one end of a drawbar. The hollow ball can be formed into a generally spherical configuration from a swagged cylindrical metal tube cut to length that is in a split swagging die having a mandrel extending inwardly from a bowl in one die to form the vertically aligned bore holes.

6 Claims, 7 Drawing Sheets

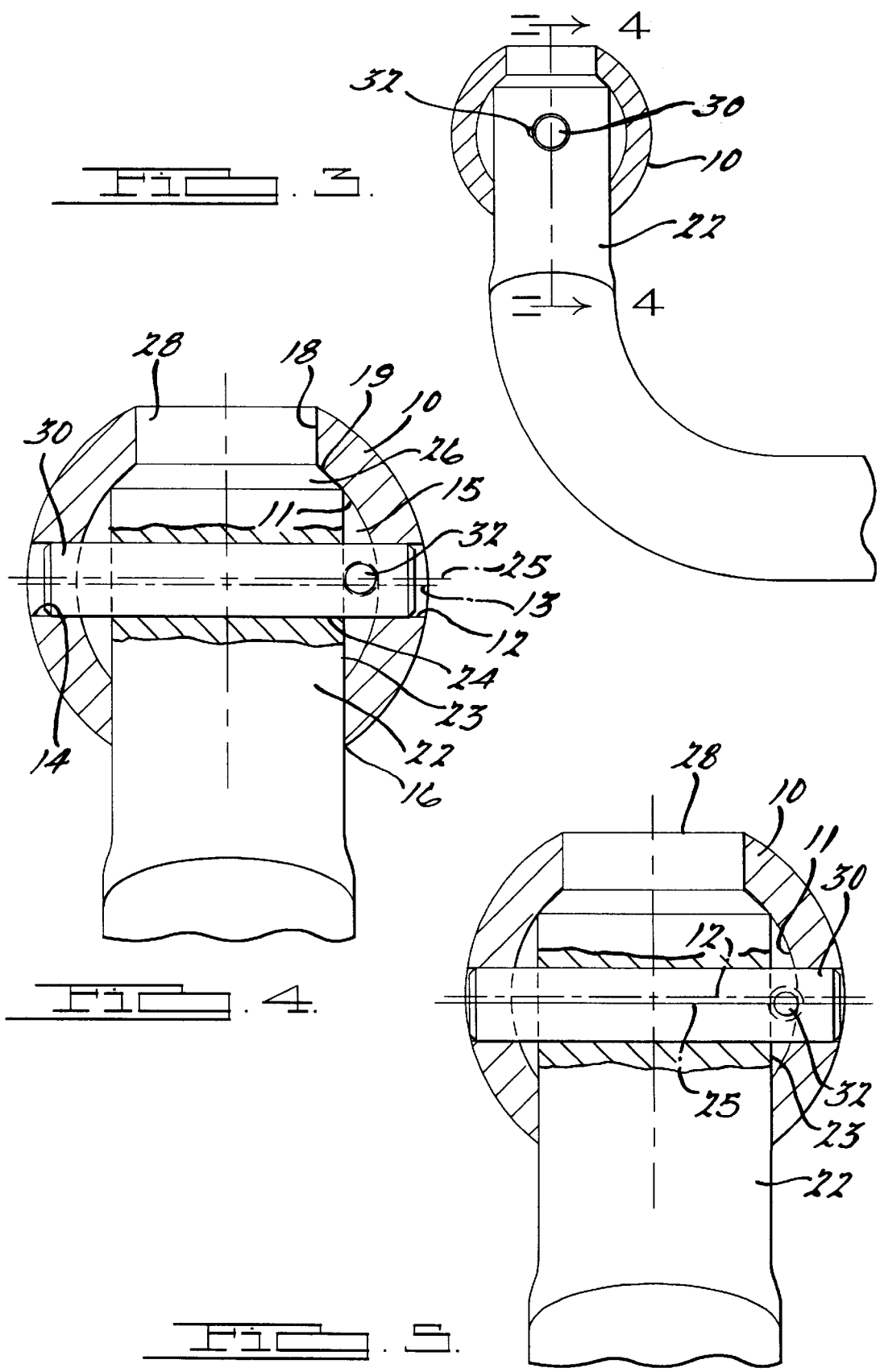

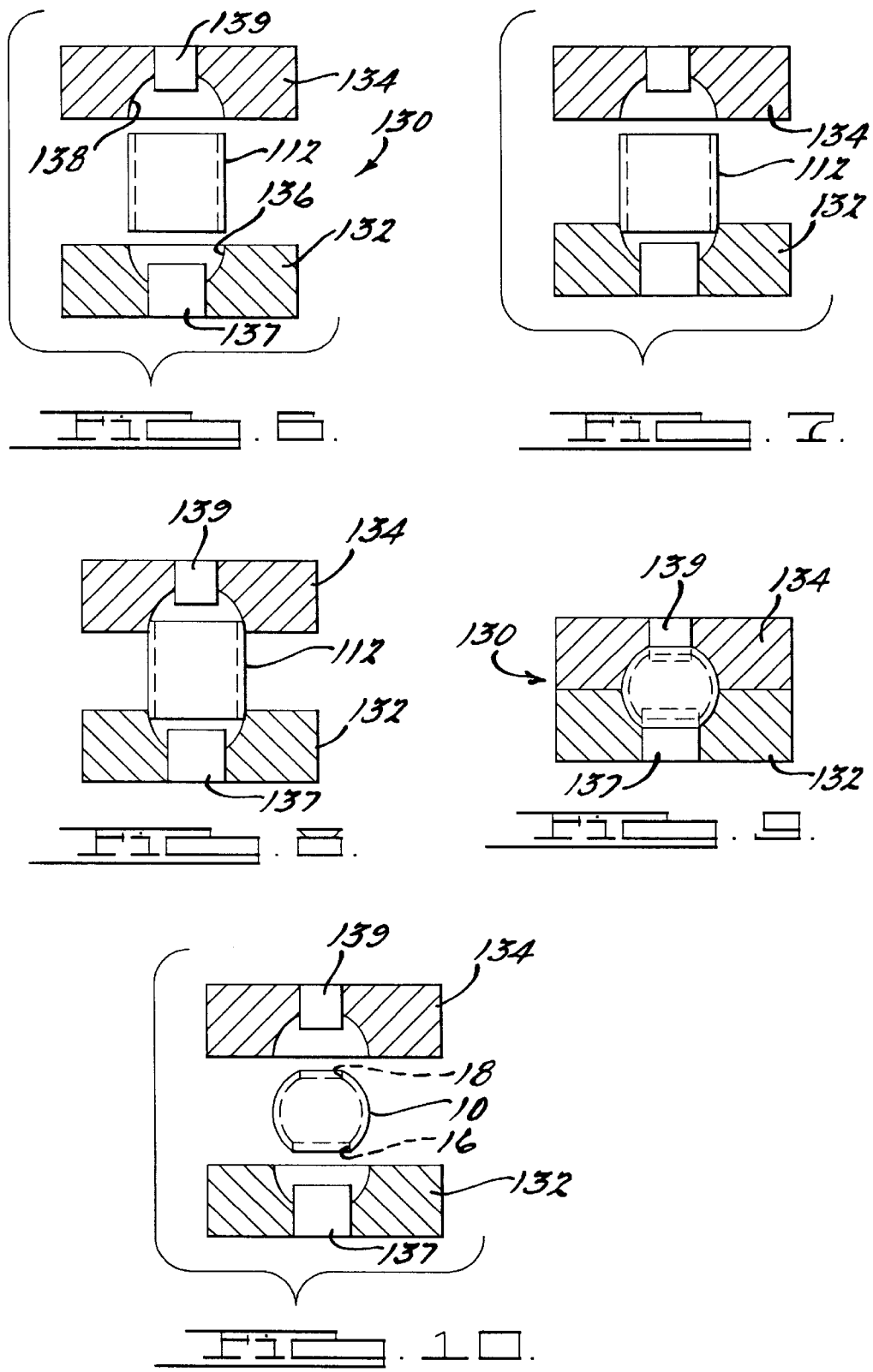

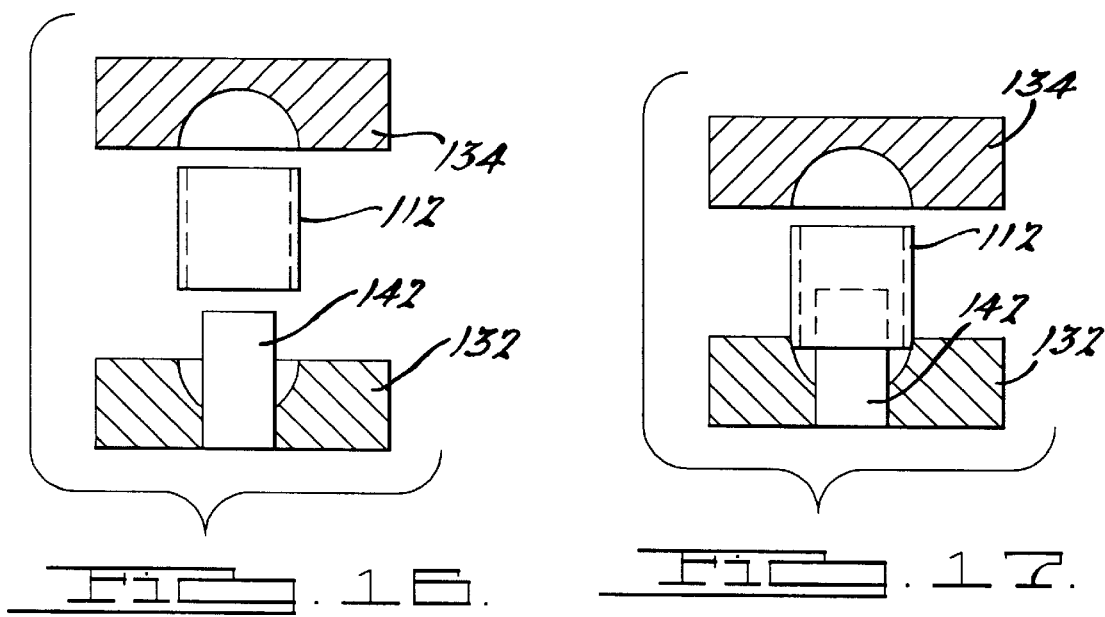
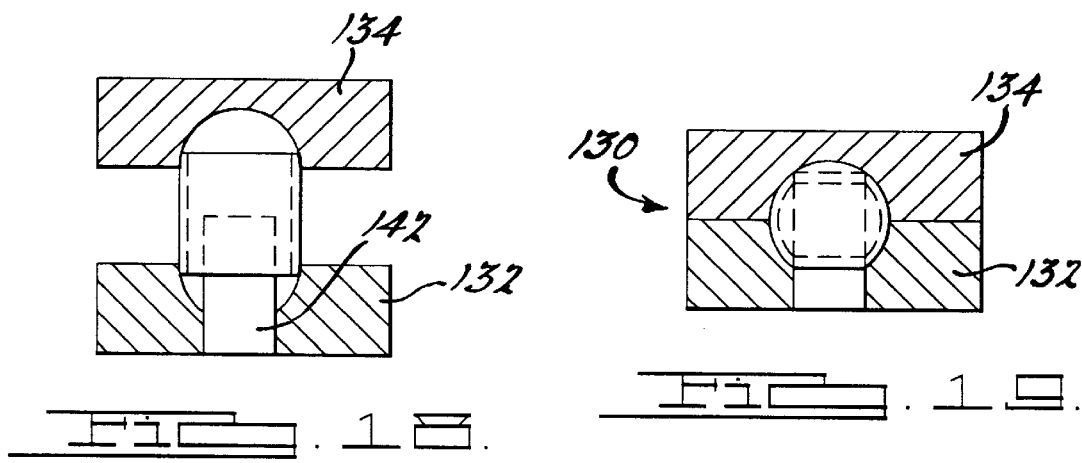
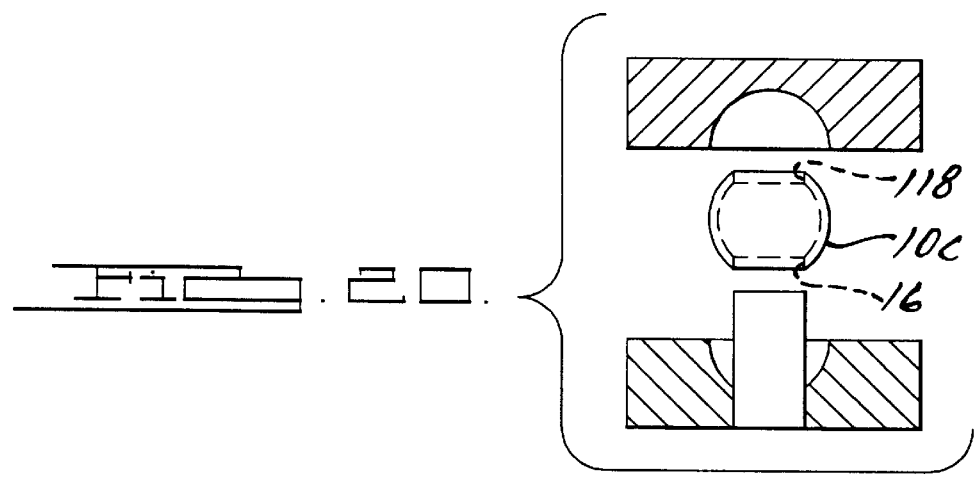

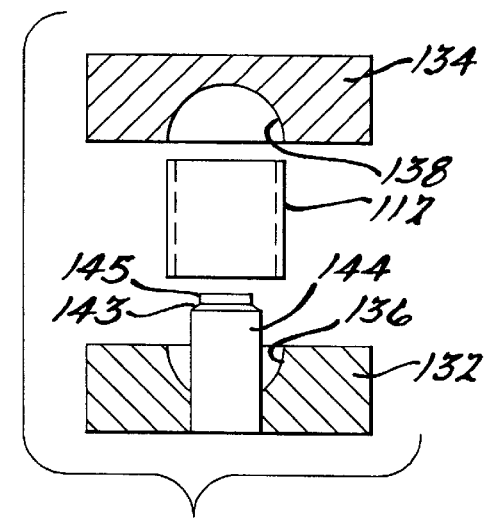
FIG. 21.
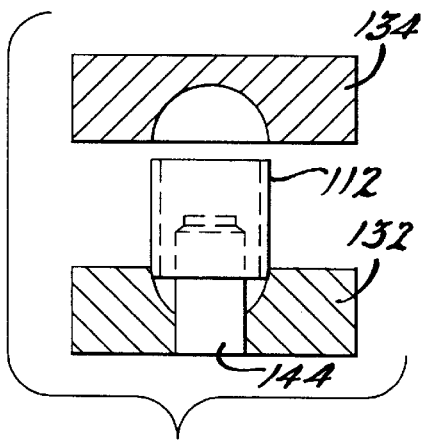
FIG. 22.
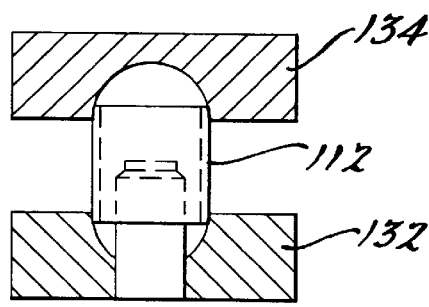
FIG. 23.
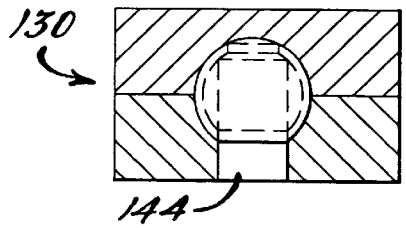
FIG. 24.
FIG. 25.
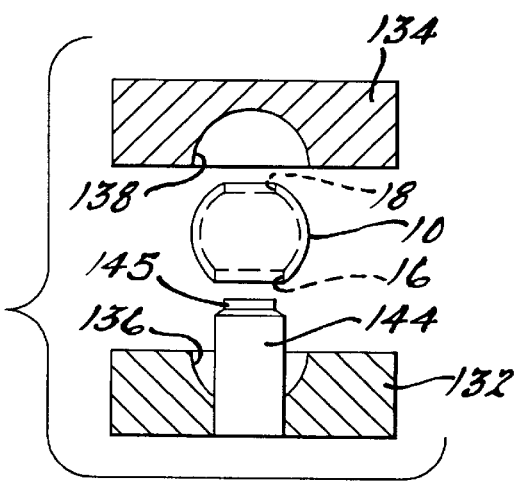

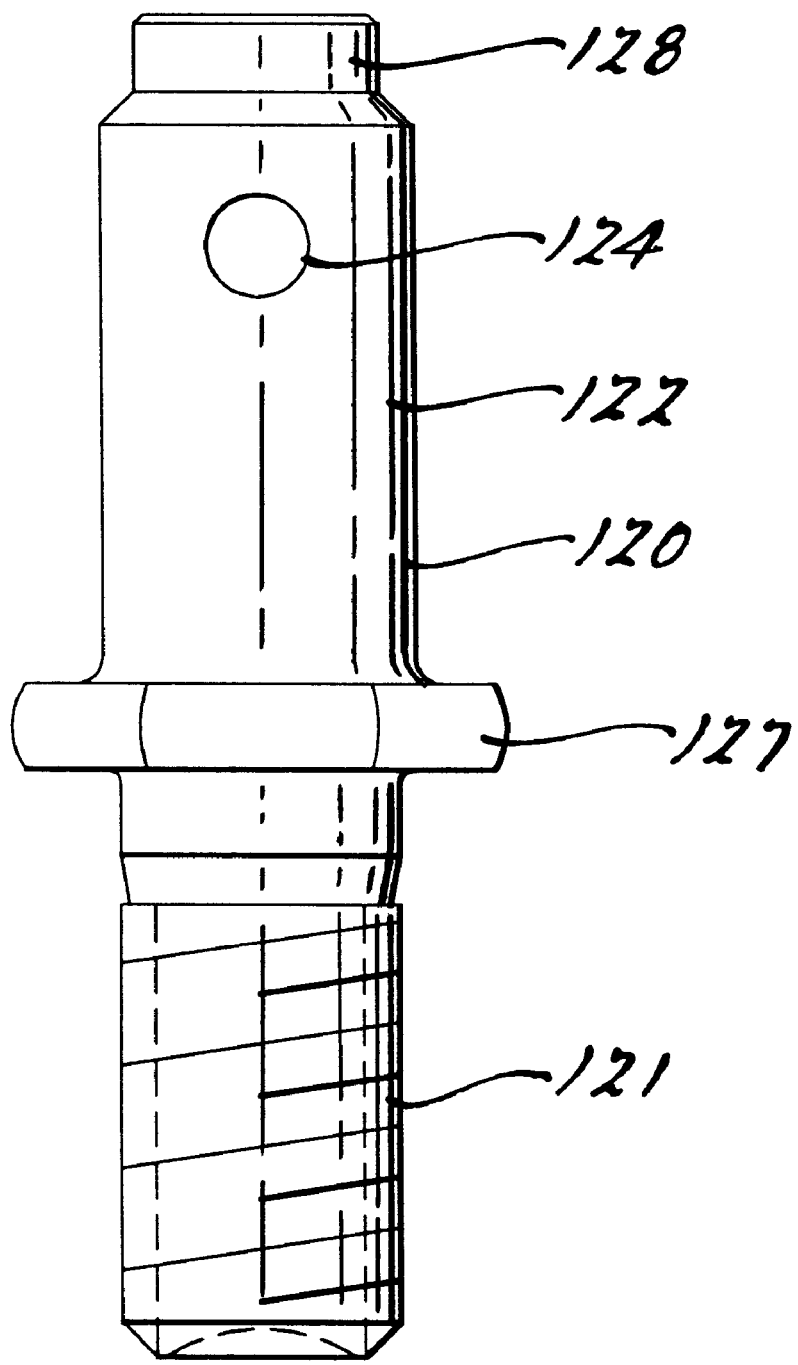
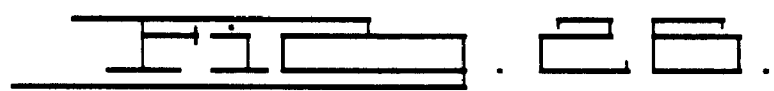

REMOVABLE TRAILER HITCH BALL

This application is a continuation of provisional application Ser. No. 60/050,041 filed Jun. 18, 1997.

BACKGROUND OF THE INVENTION

Field of the Invention

The present invention relates to trailer hitches and more particularly to a removable, interchangeable trailer hitch ball mountable on a trailer hitch for detachably connecting a trailer with a towing vehicle. Conventional trailer hitch balls are forged or upset from a uniform stock of metal and then machined to a final finished spherical configuration necessitating the use of a certain amount of material of uniform hardness and resulting in waste material.

U.S. Pat. Nos. 5,419,576; 5,290,057; 5,116,072; 4,938,496; 4,889,346; 4,772,039; 4,522,421; 4,596,406 and 4,433,854 all disclose removable and interchangeable trailer hitch balls that facilitate removal and replacement of one size ball on a stud or post with a different size ball to properly fit various sizes of sockets on a trailer coupler typically provided on a trailer tongue. While these balls have a central bore to receive the stud or post they are substantially solid with only slight clearance between the side of the stud and the bore of the ball to permit the ball to be slid onto the post. Thus, these balls are relatively heavy and expensive to manufacture.

Certain of the prior art interchangeable hitch balls employ a locking pin extending horizontally through the side of the ball and a cross bore in the stud to secure the substantially solid ball onto the stud. However, none disclose a hollow hitch ball or retractable detent ball on the side of the locking pin that protrudes between the side of the stud and the inside of the hollow hitch ball.

Many of the prior art interchangeable balls permit rotation of the ball relative to the post. However, this can cause internal wear between the post and the bore of the ball. None of the prior art discloses permanently orienting the locking pin transverse to the direction of vehicle travel to prevent the pin from jarring loose in use and possibly falling out.

U.S. Pat. No. 2,768,848 discloses a hollow trailer hitch ball that is permanently secured to a mounting stem. This hollow ball is formed by a punch and die which presses a flat sheet metal blank into a spherical shape. However, this ball cannot be removed or interchanged with other balls of different sizes.

SUMMARY OF THE INVENTION

An object of the present invention is to reduce the amount of material required, and thus lower the cost to manufacture a trailer hitch ball.

Another object of the present invention is to enable dissimilar materials and/or material of different hardness to be employed in the component parts of a hitch ball.

Another object of the present invention is to enable different size balls to be detachably secured to a stud.

Another object is to provide a light weight removable trailer hitch ball with a reduced amount of material that is manufactured at a reduced cost without sacrificing strength or performance.

Another object is to enhance the security of retaining a light weight removable trailer hitch ball on a stud.

These and various other advantages are achieved by the hitch ball of the present invention which includes a hollow spherical ball which may be formed from a tubular member pressed in a die. The die may be provided with one or two mandrels to form opposed upper and lower bores in the ball. A detachable lock pin removably secures the hollow spherical ball onto the stud and prevents the spherical ball from being detached, except when it is desired to remove the hollow ball to interchange it with another ball that may be a different size. The lock pin is inserted through horizontally aligned openings on opposed sides of the spherical ball and a horizontally aligned bore through the stud. A spring loaded detent ball is provided on a side of the lock pin and is positioned at one end of the lock pin to protrude into a space between the side of the stud and the inside of the hollow ball with the ball mounted on the stud when the lock pin is fully inserted. The bore through the stud is disposed transverse to the longitudinal axis of the trailer hitch receiver and thus transverse to the direction of vehicle travel to assist in retaining the lock pin in place during use.

In one embodiment of the present invention the hollow spherical ball is removably secured onto a stud integrally formed at one end of a drawbar shank.

BRIEF DESCRIPTION OF THE DRAWING

FIG. 3 is a fragmented partially sectioned side elevational view taken along lines 3—3 of FIG. 2;

FIG. 4 is an enlarged fragmented partially sectioned front elevational view taken along lines 4—4 of FIG. 3 showing the longitudinal centerline of the locking pin bore above the transverse centerline of the ball;

FIG. 5 shows an alternate smaller size removable hitch ball with the longitudinal centerline of the locking pin bore below the centerline of the ball;

FIGS. 6 through 10 show a method of forming a removable hitch ball from a tubular member pressed between dies having different sized mandrels forming a larger opening at the bottom of the ball than the opening formed at the top of the ball;

FIGS. 16 through 20 show an alternate method of forming a removable hitch ball using a cylindrical mandrel in the lower die to form uniform sized openings at the top and bottom of the removable hitch ball;

FIGS. 21 through 25 show an alternate method of forming a removable hitch ball with a mandrel in the lower die configured to form the spherical ball with a larger cylindrical opening at the bottom of the ball; and FIG. 26 shows a threaded stud adapted to receive a removable trailer hitch ball of the present invention.

DESCRIPTION OF THE PREFERRED EMBODIMENT

Figure 1:
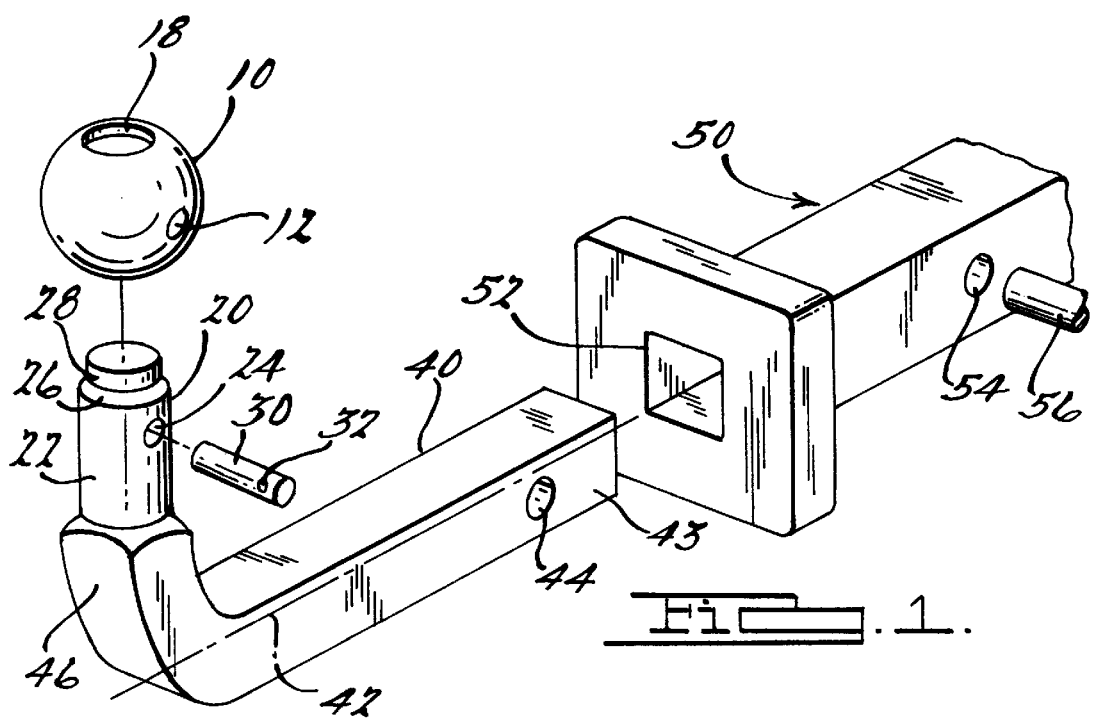
FIG. 1 is an exploded partially fragmented perspective view of a removable trailer hitch ball of the present invention with an integral one piece stud and drawbar and a trailer hitch receiver.
Figure 2:
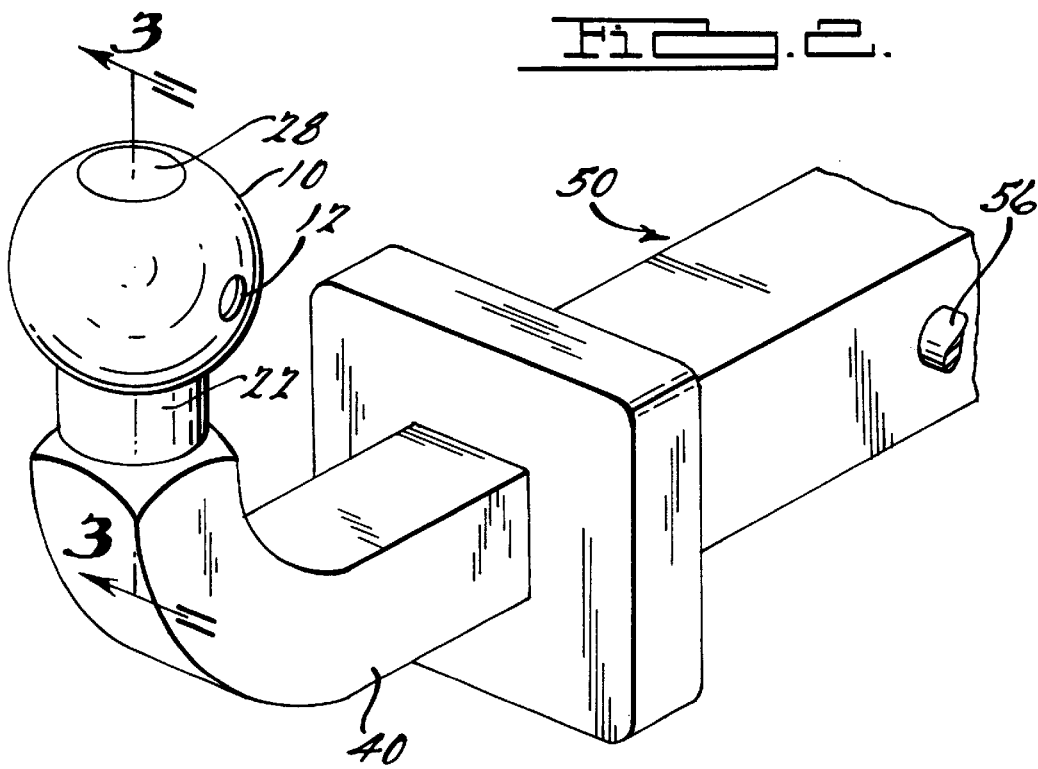
FIG. 2 is an enlarged partially fragmented perspective view of the removable trailer hitch ball of FIG. 1 mounted on an integral one piece stud and drawbar attached in a trailer hitch receiver.

Referring to FIGS. 1–4, a generally spherical hollow trailer hitch ball 10 is mounted onto a stud 20 integrally formed at an upwardly extending bent end 46 of a one piece combined stud/drawbar 40 which is received in a trailer hitch receiver 50 having an opening 52. The drawbar 40 shank 43 is made from raw stock steel sized and configured to be received in the receiver opening 52. A typical shank 43 is 1¼ inch square. The drawbar 40 is provided with a transverse bore 44 that is aligned with holes 54 extending through opposite sides of the receiver 50 upon insertion of the drawbar into the receiver 50. A cross pin 56 is inserted through one hole 54, the aligned bore 44 and through the other hole 54 and secured in place as is well known in the art. A locking pin 30 secures the hollow hitch ball 10 onto the stud 20 as described in detail below.

The stud 20 is formed with a cylindrical uniform diameter post 22 provided with a horizontal cross bore 24 extending therethrough. The cross bore 24 is transverse to the longitudinal axis 42 of the drawbar 40 and therefore transverse to the direction of travel of the towing vehicle (not shown). Since the stud 20 is integrally formed as an integral portion of the one piece combined stud/drawbar 40 the stud 20 cannot rotate relative to the longitudinally extending shank of the drawbar 40 and therefore the cross bore 24 is always maintained transverse to the longitudinal axis 42 of the shank 43 inserted into the receiver 50. Thus, the cross bore 24 remains transverse to direction of travel of the towing vehicle. The stud 20 is provided with an annular upwardly tapered shoulder 26 which connects the post 22 with a reduced diameter cylindrical head 28.

The hollow trailer hitch ball 10 is provided with a bottom hole 16 that corresponds to the size and configuration of the post 22 of the stud 20 to permit the hollow ball 10 to be mounted downwardly onto stud 20. The hollow hitch ball 10 is provided with a top hole 18 that is vertically aligned with a bottom hole 16. The top hole 18 is sized and configured to correspond to the size and configuration of the reduced diameter cylindrical head 28. With the hollow hitch ball 10 having a smaller diameter top hole 18 and the head 28 a smaller diameter than the post 22 the ball 10 will only fit on the stud 20 in the one proper direction. Furthermore, this configuration facilitates different sized hollow hitch balls 10 to be mounted onto the stud 20 while maintaining the top of the hollow ball 10 flush with the top of the head 28. The upper inside wall 19 of the hollow hitch ball 10 surrounding the top hole 18 is supported on the shoulder 26 of the stud 20. An advantage of supporting the hollow hitch ball 10 on the shoulder 26 of the stud 20 results in downward loads on the ball 10 being transmitted only to the stud 20 and not to lock pin 30. This protects the lock pin 30 from excessive wear. The horizontally aligned and opposed holes 12 and 14 of the hollow hitch ball 10 are disposed at a vertical position on the hollow hitch ball 10 such that the holes 12 and 14 through the sides of the hollow hitch ball 10 are coaxially aligned with the cross bore 24 in the post 22 when the hollow hitch ball 10 is mounted thereon. Depending on the size of the hollow hitch ball 10 the centerline of the hollow hitch ball 10 may be above, at, or below the axis 25 of the cross bore 24. In FIG. 4 the size of the hollow hitch ball 10 (i.e. two inches in diameter) results in the centerline 13 of the ball being located below the axis 25 of the cross bore 24. In FIG. 4, a smaller diameter hollow hitch ball 10 (i.e. 1⅞ inches) results in the centerline 13 of the hollow hitch ball 10 being located above the axis 25 of cross bore 24. However, holes 12 and 14 remain coaxially aligned with the cross bore 24 of the post 22. Furthermore, the top of the hollow hitch ball is flush with the top of the stud head 28 for the different sized hollow hitch balls of both FIGS. 4 and 5.

A spring biased detent ball 32 is provided on the side locking pin 30 adjacent one end thereof. Such spring biased detent balls are standard components of certain conventional fasteners. The spring biased detent ball 32 is positioned on the locking pin 30 so that upon insertion of the locking pin 30 through hole 12, the transverse cross bore 24 and toward hole 14, the detent ball 32 compresses inwardly sufficient to allow it to pass through hole 12. When the locking pin 30 becomes fully inserted so that the detent ball 32 clears the inside wall 11 of the hollow trailer hitch ball 10 the spring biased detent ball 32 is biased outwardly from the side of the locking pin 30 and becomes trapped in the space 15 between the inside wall 11 of the hollow hitch ball 10 and the side 23 of the post 22 of stud 20. This prevents further insertion of the lock pin 30 and secures the lock pin 30 in place and provides an indication that the lock pin 30 has been fully inserted. The locking pin 30 can be removed by inserting a tool (not shown) into either hole 14 and forcing the locking pin 30 back out through hole 12 which compresses the detent ball 32 until it clears the outside of the hollow ball 10. Thus, the lock pin 30 can be completely separated from the stud 20 and the ball 10 but will lock into a ball 10 to prevent loss of the lock pin 30 during storage of a hollow ball 10 and lock pin 30.

Referring to FIGS. 6 through 10, the method of forming a generally spherical hollow hitch ball 10 will be described. A cylindrical tubular member 112 cut to a predetermined length is positioned in the middle of a split swagging die 130 between a lower swagging die member 132 and an opposed upper swagging die 134. The lower die member is provided with a hemispherical bowl 136 having a cylindrical mandrel extending upward from the bottom of the bowl 136. The upper die member 134 is provided with a downwardly facing bowl 138 having a cylindrical mandrel 139 whose diameter is smaller than that of mandrel 137. The swagging die 130 is gradually closed with the opposing die members 132 and 134 forced together forming the tubular member 112 into a generally spherical ball 10 with opposed top and bottom holes 18 and 16, respectively. The top hole 18 has a relatively smaller diameter than the bottom hole 16. The size and configuration of the top and bottom holes 18 and 16 is formed during this swagging operation so that the hollow hitch ball 10 will fit snugly onto the stud 20. The split die 130 is opened as shown in FIG. 10 and the generally spherical hollow trailer hitch ball 10 is removed. The cylindrical tubular member or sleeve 112 is cut from cylindrical metal tubing having an outside diameter slightly smaller than the desired diameter of the final formed hollow ball 10. This allows the tubular member 112 to expand slightly during the pressing operation while preventing a part line at the equator of the hollow ball 10. The generally spherical hollow ball 10 is cross drilled to form the horizontally aligned holes 10 and 12 that receive the lock pin 30. The shank 43 is cut to length, drilled, bent and stamped to form the drawbar 40. The stud 20 may be cold forged to shape or machine to the desired final profile. The stud 20 is then cross drilled to form cross bore 24 to receive the lock pin 30.

Figures 11, 12:
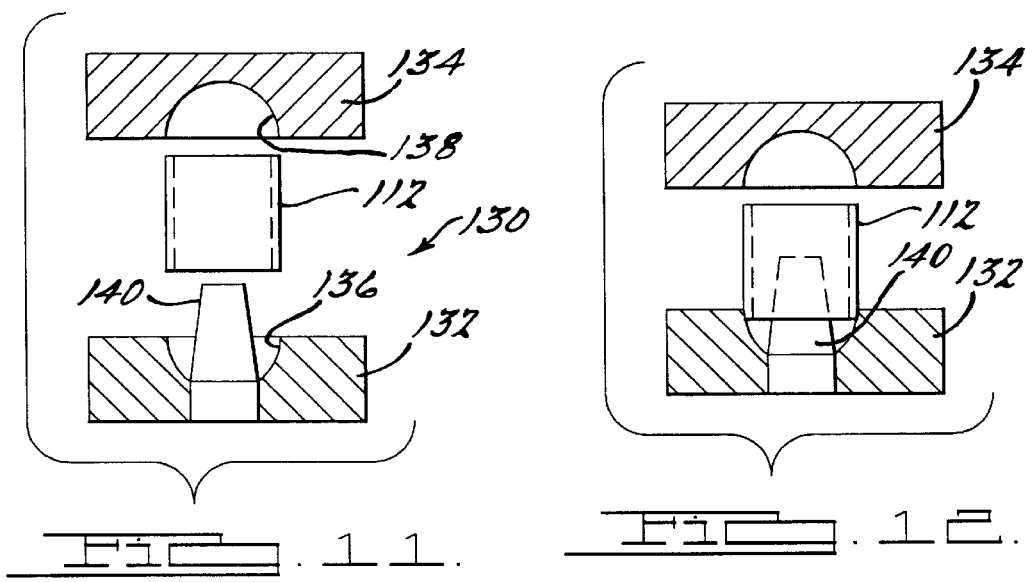
FIGS. 11 through 15 show an alternate method of forming a removable hitch ball using a tapered mandrel in the lower die.
Figures 13, 14:
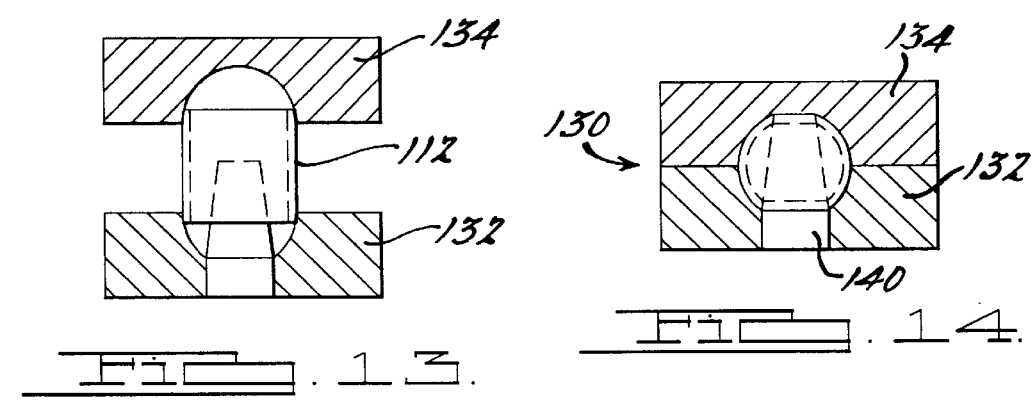
Figure 15:
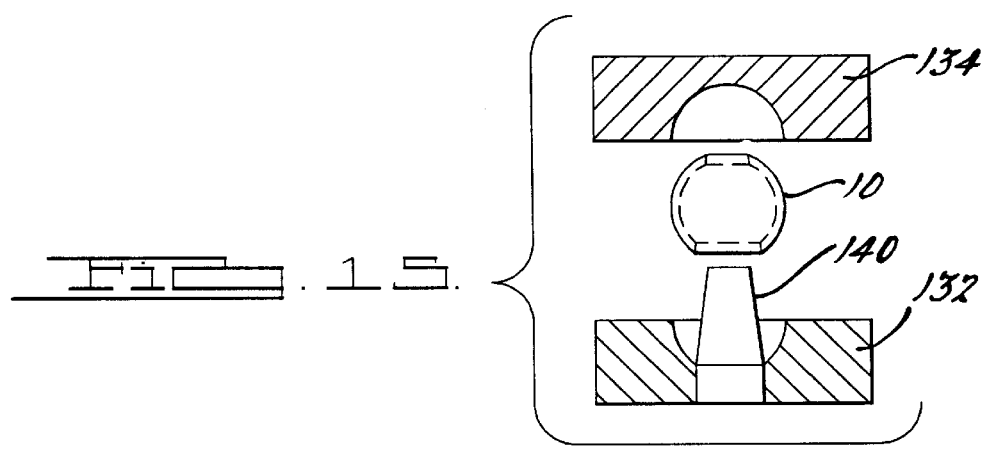

An alternate method of forming the hollow hitch ball 10 is shown in FIGS. 11 through 15 using a single upwardly tapering mandrel 140 extending upwardly from the lower bowl 136 formed in the lower swagging die member 132 to form the top hole 18 and larger diameter bottom hole 16. Otherwise the method is the same as described above with respect to FIGS. 6 through 10.

The method of forming the generally spherical hollow ball 10 shown in FIGS. 21 through 25 is essentially the same as described previously, except that a cylindrical mandrel 142 is used instead of the tapered mandrel 140 of FIGS. 11 through 15. This uniform diameter cylindrical mandrel forms a hollow hitch having ball 10c having top and bottom holes 18 and 16, respectively, having the same diameter as seen in FIG. 20. This hollow hitch ball 10c would be mounted on a cylindrical stud 20 having a corresponding uniform diameter post 22 from bottom to top.

FIGS. 21 through 25 show a similar method, except a single mandrel 144 extends upwardly from the bottom of lower bowl 136 to form a hollow hitch ball 10 with a smaller top hole 18 and a larger bottom hole 16 in the ball 10. This is accomplished by providing a reduced diameter head 145 at the top of the mandrel. A slightly tapered shoulder 143 interfaces the reduced diameter head 145 with the lower larger diameter bottom of mandrel 144.

Referring to FIG. 26, a stud 120 is cold forged with threads 121 machined in a lower portion extending downwardly from below mounting flange 127. The post 122 is provided with a cross bore 124 to receive the lock pin 30 with a spring biased detent ball 32 as previously described, after a hollow hitch ball 10 is mounted onto the stud 122 in the same manner as the hollow hitch ball 10 is mounted onto a stud 22 combination stud/drawbar 40 as shown and described with respect to FIGS. 1–5. This threaded stud 120 can be mounted onto a bumper (not shown) or a conventional drawbar shank (not shown) as is well known.

The foregoing is a description of the preferred and alternative embodiments of the invention which may be modified without departing from the spirit or the scope of the following claims and their equivalents.

I claim:

1. A removable trailer hitch ball assembly comprising:

a stud having an upwardly extending post, said post including a horizontally disposed cross bore extending through said post from one side of said post to an opposite side;

a generally spherical hollow hitch ball with opposed horizontally aligned openings in opposite side walls of said hollow hitch ball, said hollow hitch ball adapted to be mounted onto said stud so that the opposed openings of said hollow hitch ball are horizontally aligned with said cross bore through said post and a space is provided between the inner surface of said hollow hitch ball and a side of said post;

a lock pin for insertion through said aligned openings and cross bore with said hollow hitch ball mounted on said stud, said lock pin having a spring biased detent ball on a side thereof, said detent ball located at a position adjacent one end of said lock pin so that upon said insertion of said lock pin the detent ball compresses inwardly sufficient to pass through one of said aligned openings and upon clearing the inside surface of said hollow hitch ball is biased outwardly from the side of the lock pin and becomes trapped between the inside surface of the hollow hitch ball and the side of the post to secure the lock pin in the inserted position.

2. The removable trailer hitch ball assembly of claim 1 including an elongated drawbar having an upwardly bent end and wherein said stud is formed as an integral portion of said upwardly bent end to form a one piece integral combination stud and drawbar.

3. The removable trailer hitch ball assembly of claim 2 wherein said cross bore is disposed transverse to the longitudinal axis of said elongated drawbar.

4. The removable trailer hitch ball assembly of claim 1 wherein said stud includes an outwardly radiating mounting flange and a lower threaded portion extending downwardly from below said mounting flange.

5. The removable trailer hitch ball assembly of claim 1 wherein said stud is provided with a head at the top of said post, said head is smaller in cross section than said post, and said hollow hitch ball provided with top and bottom vertically aligned apertures respectively corresponding to the size and configuration of said head and said post for mounting said hollow hitch ball on said stud in one direction to facilitate mounting one of different sized hollow hitch balls onto said stud.

6. The removable trailer hitch ball assembly of claim 5 wherein said stud is provided with a shoulder disposed between said post and said head, said shoulder supporting said hollow hitch ball mounted on said stud.

* * * * *